(12) United States Patent
Wu et al.

(10) Patent No.: US 7,692,738 B2
(45) Date of Patent: Apr. 6, 2010

(54) DISPLAY PANEL COMPRISING POLARIZERS WITH THERMAL EXPANSION COEFFICIENTS AND ADHESIVE LAYERS WITH THICKNESSES, AND A METHOD FOR MANUFACTURING THEREOF

(75) Inventors: Pei-Hsun Wu, Hsin-Chu (TW); Ying-Che Lan, Hsin-Chu (TW); Wen-Fang Sung, Hsin-Chu (TW); Chih-Haw Wang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 210 days.

(21) Appl. No.: 11/896,958

(22) Filed: Sep. 7, 2007

(65) Prior Publication Data
US 2008/0074584 A1 Mar. 27, 2008

(30) Foreign Application Priority Data
Sep. 25, 2006 (TW) .............................. 95135409 A

(51) Int. Cl.
*G02F 1/1335* (2006.01)
(52) U.S. Cl. ........................................ 349/96; 349/122
(58) Field of Classification Search .................. 349/96, 349/122, 106, 65, 158, 138; 428/1.31; 445/24
See application file for complete search history.

(56) References Cited

U.S. PATENT DOCUMENTS 5,818,559 A * 10/1998 Yoshida ...................... 349/122
6,831,713 B2 * 12/2004 Sugino et al. ................. 349/96
7,499,126 B2 * 3/2009 Ham ............................ 349/96
2006/0114387 A1 6/2006 Song et al.

FOREIGN PATENT DOCUMENTS

CN 1782807 A 6/2006

\* cited by examiner

*Primary Examiner*—Thoi V Duong
(74) *Attorney, Agent, or Firm*—Bacon & Thomas, PLLC

(57) ABSTRACT

A display panel includes: a first substrate; a second substrate; a liquid crystal layer; a first polarizer having a temperature $T_{P1}$ and a thermal expansion coefficient $\alpha_{P1}$; a second polarizer having a temperature $T_{P2}$ and a thermal expansion coefficient $\alpha_{P2}$; a first adhesive layer having a first thickness $h_1$; and a second adhesive layer having a second thickness $h_2$; wherein the first adhesive layer is disposed between the first polarizer and the first substrate, the second adhesive layer is disposed between the second polarizer and the second substrate, and the parameters illustrated below:

$$\frac{\alpha_{P1}(\Delta T_{P1})}{\alpha_{P2}(\Delta T_{P2})} = \left(\frac{h_1}{h_2}\right)^{1-n};$$

wherein "n" is an exponent of power law,
$\Delta T_{P1} = T_{P1} - T_R$, $\Delta T_{P2} = T_{P2} - T_R$, and $T_R$ is the temperature of the ambient environment.

24 Claims, 7 Drawing Sheets

DISPLAY PANEL COMPRISING POLARIZERS WITH THERMAL EXPANSION COEFFICIENTS AND ADHESIVE LAYERS WITH THICKNESSES, AND A METHOD FOR MANUFACTURING THEREOF

BACKGROUND OF THE INVENTION

1. Field of the Invention

The present invention relates to a display panel and, more particularly, to a display panel capable of effectively preventing the light-leakage near the border thereof, which is resulted from the long-term exposure to the heat produced by the underlying backlight module.

2. Description of Related Art

A polarizer in a display panel can adjust and control the polarization direction of light therethrough, in order to thereby cooperate with the liquid crystal molecules for controlling of operation of the display units (pixels) of the display panel. FIG. 1A is a schematic view of a convention polarizer applied to a display panel. As shown in FIG. 1A, the polarizer 1 has a body formed by a polyvinyl alcohol (PVA) 11, and two protection layers 121, 122 locating on the top side and the bottom side of the body. The polarizer 1 is adhered to a surface of the glass substrate 14 by a pressure-sensitive adhesive (PSA) 13.

After a long-term operation of the display panel with the polarizer 1, i.e. the display panel is long-term heated by the heat produced by the backlight module, the temperature of the display panel is increased, resulting in the deformed is near the borders of the display panel, which the cause of deformed is from the shrinkage stress of the polarizer 1 is changed, for with the different thermal expansion coefficients of the body of the polarizer 11 and the protection layers 121, 122. Besides, the stickiness of the pressure-sensitive adhesive (PSA) 13 is also gradually reduced due to the heating. In general, the change of the shrinkage stress of the polarizer 1 is increased as the temperature is increased.

After the display panel has been used over a long period, the lower polarizer closer to the backlight module has the temperature higher than that of the upper polarizer far away from the backlight module, and which causes the shrinkage stress of the upper polarizer different from that of and the lower polarizer. Accordingly, the deformed near the borders of the display panel occurs, as shown in FIG. 1B. As a result, the light-leakage near the border of the display panel is experienced. In addition, the central portion of the display panel will be easily contacted with the optical films of the underlying backlight module 16 so as to cause defects of the optical films (such as backlight diffusers). Therefore, after a long-term operation, the display panel 15 of the prior art has a poor display quality due to the light-leakage near the border of the display panel and the defects formed on the optical films of the underlying backlight module.

Accordingly, it is desirable to provide a display panel with an improved display panel to mitigate and/or obviate the aforementioned problems and thereby to improve the display quality of the display panel.

SUMMARY OF THE INVENTION

The present invention provides a display panel includes: a first substrate; a second substrate; a liquid crystal layer interposed between the first substrate and the second substrate; a first polarizer, disposed on a surface of the first substrate, and having a first thermal expansion coefficient $\alpha_1$; a second polarizer, disposed on a surface of the second substrate, and having a second thermal expansion coefficient $\alpha_2$; a first adhesive layer, formed between the first polarizer and the first substrate, and having a first thickness $h_1$; and a second adhesive layer, formed between the second polarizer and the second substrate, and having a second thickness $h_2$; wherein the first thickness $h_1$ is substantially different from the second thickness $h_2$, and the first thermal expansion coefficient $\alpha_1$ is substantially equal to the second thermal expansion coefficient $\alpha_2$.

The present invention also provides a display panel includes: a first substrate; a second substrate; a liquid crystal layer interposed between the first substrate and the second substrate; a first polarizer, disposed on a surface of the first substrate, and having a first thermal expansion coefficient $\alpha_1$; a second polarizer, disposed on a surface of the second substrate, and having a second thermal expansion coefficient $\alpha_2$; a first adhesive layer, formed between the first polarizer and the first substrate, and having a first thickness $h_1$; and a second adhesive layer, formed between the second polarizer and the second substrate, and having a second thickness $h_2$; wherein the first thickness $h_1$ is substantially equal to the second thickness $h_2$, and the first thermal expansion coefficients $\alpha_1$ is substantially different from the second thermal expansion coefficient $\alpha_2$.

The present invention also provides a method for manufacturing a display panel, comprising: providing a first substrate and a second substrate corresponding to the first substrate; assembling a liquid crystal layer between the first substrate and the second substrate; and providing a first polarizer adhered to the outer surface of the first substrate via a first adhesive layer, and a second polarizer adhered to the outer surface of the second substrate via the second adhesive layer; wherein a first thickness $h_1$ of the first adhesive layer is substantially different from a second thickness $h_2$ of the second adhesive layer and a first thermal expansion coefficient $\alpha_1$ of the first polarizer is substantially equal to a second thermal expansion coefficient $\alpha_2$ of the second polarizer.

The present invention also provides a method for manufacturing a display panel, the method comprising: providing a first substrate and a second substrate corresponding to the first substrate; assembling a liquid crystal layer between the first substrate and the second substrate; and providing a first polarizer adhered to the outer surface of the first substrate via a first adhesive layer, and a second polarizer adhered to the outer surface of the second substrate via the second adhesive layer; wherein a first thickness $h_1$ of the first adhesive layer is substantially equal to a second thickness $h_2$ of the second adhesive layer and a first thermal expansion coefficient $\alpha_1$ of the first polarizer is substantially different from a second thermal expansion coefficient $\alpha_2$ of the second polarizer.

Other objects, advantages, and novel features of the present invention will become more apparent from the following detailed description when taken in conjunction with the accompanying drawings.

DETAILED DESCRIPTION OF THE EMBODIMENT

Figure 1A:
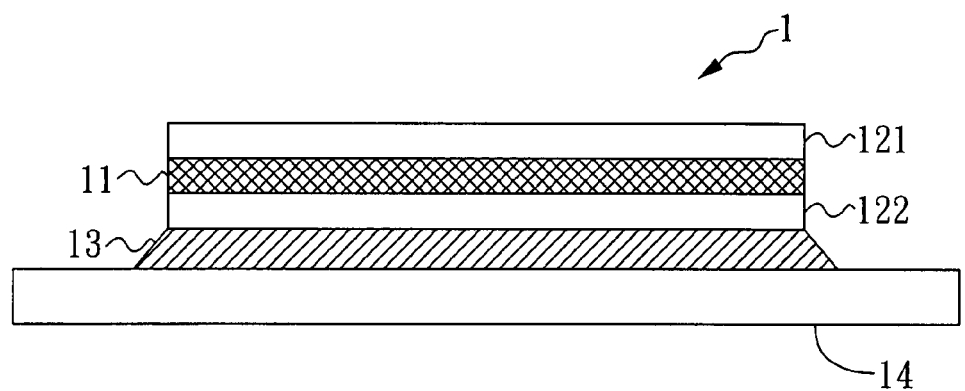
FIG. 1A is a schematic view of a prior art polarizer applied to a display panel.
Figure 1B:
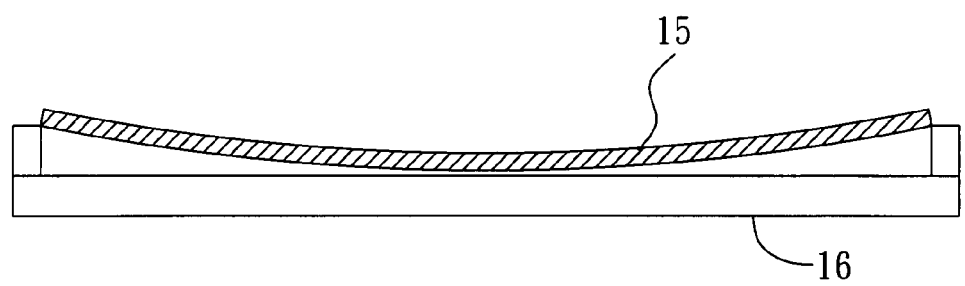
FIG. 1B is a schematic view of a prior art polarizer applied to a display panel, after a long-term operation of the display panel.
Figure 2A:
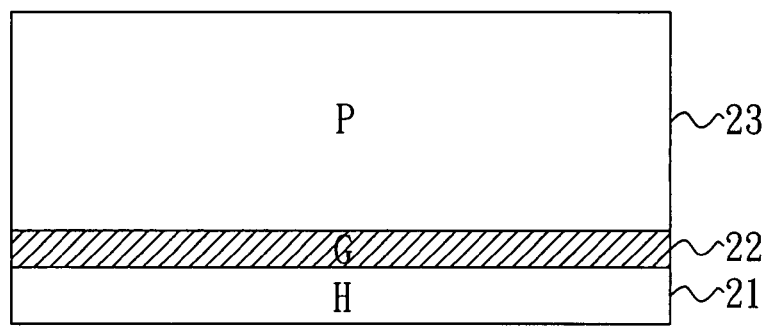
FIGS. 2A and 2B are schematic views of a simplified model of a part of a display panel for the derivation of a formula according to the present invention.
Figure 2B:
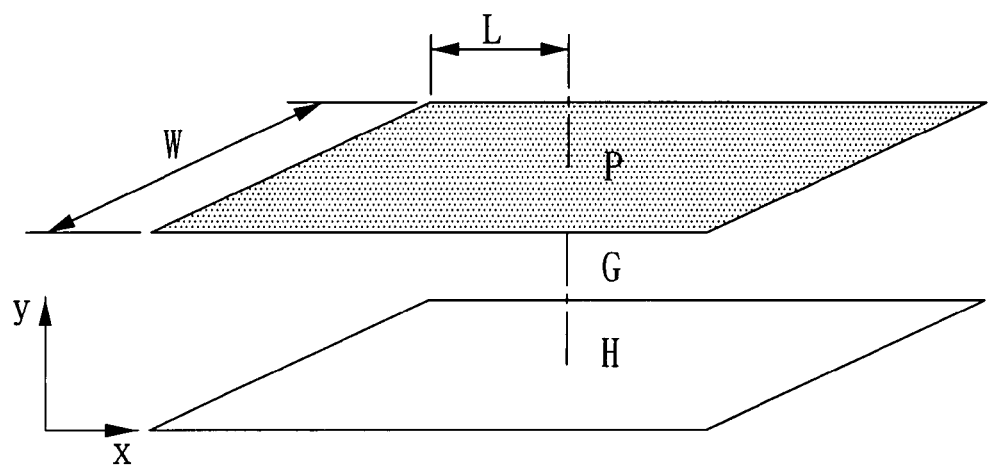

FIGS. 2A and 2B are schematic views of a simplified model of a part of a display panel for the derivation of a formula according to the present invention. As shown in FIGS. 2A and 2B, the polarizer includes a substrate (H) 21, an adhesive layer (G) 22, and a body (P) 23. The body 23 of the polarizer is adhered to a surface of the substrate 21 by the adhesive layer 22.

In the display panel of the present invention, before the derivation a formula regarding a relation between the "thermal expansion coefficients" of the upper and the lower polarizers and the "thickness" of the two adhesive layers respectively adhered to the upper and lower substrates, the following hypotheses must be proposed, in order to simplify the derivation of the formula.

1. The display panel of the present invention has a symmetrical structure.

2. A polarizer (P) and a substrate (H) of the display panel of the present invention will be shrunk toward their center portions, respectively, which is resulting from the heating of the polarizer (P) and the substrate (H). Besides, the degree of the shrinkage of the substrate (H) is much smaller than that of the polarizer (P).

3. While the polarizer (P) of the display panel of the present invention is shrunk, a shear force V is applied to the adhesive layer (G) of the display panel of the present invention.

4. The shrinkage of the substrate (H) will make the adhesive layer (G) thereon shifts with a certain amount, but the substrate (H) will not shift along with the adhesive layer (G) thereon.

5. The adhesive layer (G) is a non-compressible fluid, and the normal stress applied to the adhesive layer (G) can be omitted.

6. The adhesive layer (G) is limited to flow in a direction parallel to the X-direction of FIG. 2B, and the flow speed of the adhesive layer (G) does not change with time.

7. The stress in the X-direction of FIG. 2B is varied continuously.

8. The temperature of the entire display panel of the present invention is changed (such as changed linearly) in the Y-direction shown of FIG. 2B.

Next, based on the aforementioned hypotheses, an equation of continuity, i.e., mass balance, for the simplified model of the polarizer of the present invention can be obtained as follows:

$$\cancel{\frac{\partial \rho}{\partial t}} + \frac{\partial}{\partial x}(\rho v_x) + \frac{\partial}{\partial y}(\cancel{\rho v_y}) + \frac{\partial}{\partial z}(\cancel{\rho v_z}) = 0 \quad (1)$$

$$\Longrightarrow \frac{\partial v_x}{\partial x} = 0;$$

and an equation of momentum in the X-direction of FIG. 2B, i.e., energy balance, can be obtained as follows:

$$\rho\left(\cancel{\frac{\partial v_y}{\partial t}} + v_x \cancel{\frac{\partial v_y}{\partial x}} + v_y \cancel{\frac{\partial v_y}{\partial y}} + v_z \cancel{\frac{\partial v_y}{\partial z}}\right) = \quad (2)$$

$$-\cancel{\frac{\partial P}{\partial x}} - \left(\cancel{\frac{\partial}{\partial x}\tau_{xx}} + \frac{\partial}{\partial y}\tau_{yx} + \cancel{\frac{\partial}{\partial z}\tau_{zx}}\right) \Longrightarrow$$

$$\tau_{yx} = const = \frac{V}{LW};$$

while the power law can also be obtained as follows:

$$\tau_{yx} = -m\dot{\gamma}^n = -m\left(\frac{dv_x}{dy}\right)^n = \frac{V}{LW} \quad (\dot{\gamma}: \text{strain rate}) \quad (3)$$

$$\Rightarrow \frac{dv_x}{dy} = -\left(\frac{V}{mLW}\right)^{1/n}$$

$$\Rightarrow v_x = -\left(\frac{V}{mLW}\right)^{1/n} y + C_1;$$

wherein $C_1$ is a constant.

Next, the boundary conditions Vx is substantially equal to 0 as y is substantially equal to 0 are introduced into the equation (3), and then the equation (3) can be further simplified as follows:

$$\Rightarrow v_x = -\left(\frac{V}{mLW}\right)^{1/n} y. \quad (4)$$

Figure 3A:
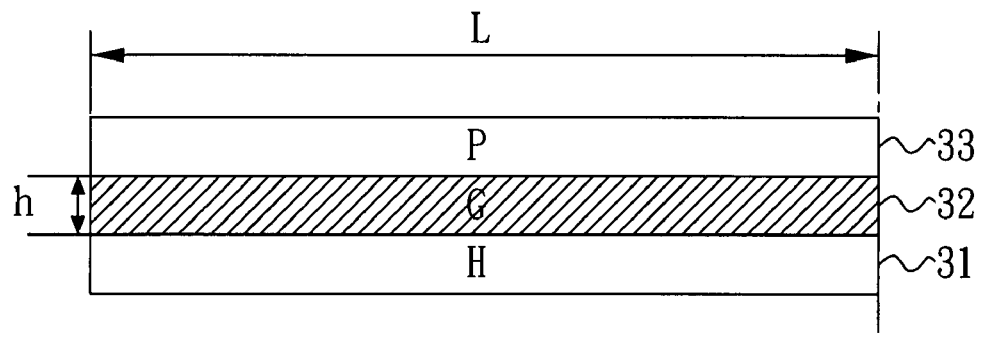
FIG. 3A is a schematic view of a simplified model of a part of a display panel for the derivation of a formula according to the present invention, wherein the display panel having the polarizer has not been heated by a backlight module of the display panel.
Figure 3B:
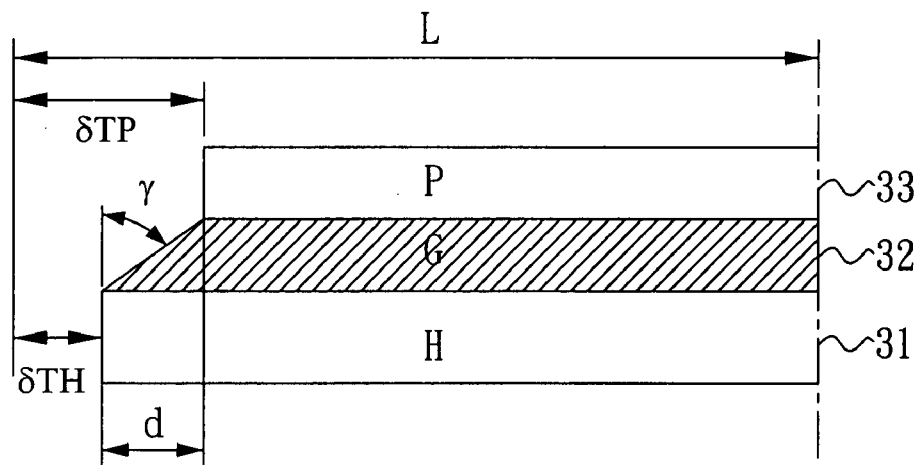
FIG. 3B is a schematic view of a simplified model of a part of a display panel for the derivation of a formula according to the present invention, wherein the display panel having the polarizer has been heated by a backlight module of the display panel, and the polarizer is deformed due to the heating.

Next, referring to FIGS. 3A and 3B, wherein FIG. 3A is a schematic view of a simplified model of a part of a display panel for the derivation of a formula according to the present invention, wherein the display panel having the polarizer has not been heated by a backlight module of the display panel, and FIG. 3B is a schematic view of a simplified model of a part of a display panel for the derivation of a formula according to the present invention, wherein the display panel having the polarizer has been heated by a backlight module of the display panel and the polarizer is deformed due to the heating. As shown in FIGS. 3A and 3B, the part of the display panel has a polarizer includes a substrate (H) 31, an adhesive layer (G) 32 and a body (P) 33 of the polarizer.

As shown in FIG. 3B, the substrate 31 shrinks to its center portion due to the heating. Accordingly, the adhesive layer 32 thereon has a shift $\delta_{TH}$, which can be expressed by the following equation:

$$\delta_{TH} = \epsilon_{TH} \bullet L = \alpha_H(\Delta T_P)L; \quad (5)$$

wherein $\epsilon_{TH}$ is a thermal strain of the substrate 31, and $\alpha_H$ is the thermal expansion coefficient of the substrate 31.

In addition, the shrink of the body 33 of the polarizer can apply a shear force V to the adhesive layer 32 and thereby produce a shear strain of the adhesive layer 32. In this case, it is met that $$d = \delta_{TP} - \delta_{TH};$$

; and $\delta_{TP}$ can be further expressed by:

$$\delta_{TP} = \epsilon_{TP} \bullet L = \alpha_P(\Delta T_P)L; \quad (6)$$

wherein $\epsilon_{TP}$ is a thermal strain of the body 33 of the polarizer, and $\alpha_H$ is a thermal expansion coefficient of the body 33 of the polarizer. Alternately, d in the above equation can also be expressed by the following equation:

$$d = h\tan\gamma \approx h\gamma = \frac{hV}{(L-\delta_{TP})WG_g} = \frac{hV}{(1-\alpha_P(\Delta T_P))LWG_g}; \quad (7)$$

wherein h is the thickness of the pressure-sensitive adhesive layer (PSA) 32, $G_g$ is a shear modulus of the pressure-sensitive adhesive layer 32, and $\gamma$ is a shear strain of the pressure-sensitive adhesive layer 32.

Accordingly, equation (8) is taken as follows.

$$\Rightarrow \alpha_P(\Delta T_P) \cdot L - \alpha_H(\Delta T_H) \cdot L = \frac{hV}{(1-\alpha_P(\Delta T_P))LWG_g} \quad (8)$$

$$\Rightarrow V = \frac{[\alpha_P(\Delta T_P) - \alpha_H(\Delta T_H)](1 - \alpha_P(\Delta T_P))L^2 WG_g}{h}.$$

Lastly, equation (8) is brought into equation (4), and equation (9) is found as follows.

$$v_{xi} = -\left[\frac{[\alpha_P(\Delta T_P) - \alpha_H(\Delta T_H)](1 - \alpha_P(\Delta T_P))L^2 WG_g}{h_i} \cdot \frac{1}{mLW}\right]^{1/n_i} y \quad (9)$$

$$= -\left[\frac{[\alpha_P(\Delta T_P) - \alpha_H(\Delta T_H)](1 - \alpha_P(\Delta T_P))LG_g}{mh_i}\right]^{1/n_i} y.$$

For the first polarizer disposed on the upper portion of the display panel of the present invention, the "i" of equation (9) is set to 1, while for the second polarizer disposed on the lower portion of the display panel of the present invention, the "i" of equation (9) is set to 2. Besides, when y is substantially equal to $h_1$, $h_1$ is substantially equal to $h_2$, $V_{x1}$ is substantially equal to $V_{x2}$ and equation (10) is taken as follows:

$$\frac{v_{x1}}{v_{x2}} = \frac{h_1}{h_2}\left[\frac{[\alpha_{P1}(\Delta T_{P1}) - \alpha_{H1}(\Delta T_{H1})](1 - \alpha_{P1}(\Delta T_{P1}))G_{g1}}{m_1 h_1}\right]^{1/n_1} \quad (10)$$

$$\left[\frac{m_2 h_2}{[\alpha_{P2}(\Delta T_{P2}) - \alpha_{H2}(\Delta T_{H2})](1 - \alpha_{P2}(\Delta T_{P2}))G_{g2}}\right]^{1/n_2} L^{(1/n_1 - 1/n_2)}$$

$$= \left[\frac{[\alpha_{P1}(\Delta T_{P1}) - \alpha_{H1}(\Delta T_{H1})](1 - \alpha_{P1}(\Delta T_{P1}))G_{g1}}{m_1}\right]^{1/n_1}$$

$$\left[\frac{m_2}{[\alpha_{P2}(\Delta T_{P2}) - \alpha_{H2}(\Delta T_{H2})](1 - \alpha_{P2}(\Delta T_{P2}))G_{g2}}\right]^{1/n_2}$$

$$L^{(1/n_1 - 1/n_2)} \frac{h_1^{(1-1/n_1)}}{h_2^{(1-1/n_2)}}$$

$$= 1$$

When the first polarizer (i is substantially equal to 1) and the second polarizer (i is substantially equal to 2) are both disposed on surfaces of substrates (H) made of the same material, and first adhesive layer and the second adhesive layer are both made of pressure-sensitive adhesive. $\alpha_{H1}$ is substantially equal to $\alpha_{H2}$, $\alpha_{H2}$ is substantially equal to $\alpha_H$; $m_1$ is substantially equal to $m_2$, while $m_2$ is substantially equal to m; $n_1$ is substantially equal to $n_2$, while $n_2$ is substantially equal to n; and $G_{g1}$ is substantially equal to $G_{g2}$, while $G_{g2}$ is substantially equal to $G_g$. Accordingly, equation (10) can be further simplified into the form as follows:

$$\left[\frac{[\alpha_{P1}(\Delta T_{P1}) - \alpha_H(\Delta T_{H1})](1 - \alpha_{P1}(\Delta T_{P1}))}{[\alpha_{P2}(\Delta T_{P2}) - \alpha_H(\Delta T_{H2})](1 - \alpha_{P2}(\Delta T_{P2}))}\right] = \left(\frac{h_1}{h_2}\right)^{1-n} \quad (11)$$

Subsequently, the relation between the applied material features of the polarizers (such as the thermal expansion coefficients) and the thickness of the adhesive layers requiring for fastening the polarizers in the display panel can be described by equation (11). Thus, the shrink caused by the long-term heating by the backlight module can be prevented in the display panel of the present invention. As a result, the light-leakage near the border of the display panel can be thus prevented.

An example of a display monitor will be given in the following for further description.

In a normal operation, the temperature of the upper portion of the display panel of the display monitor is about 30° C., and the temperature of the lower portion of the display panel of the display monitor is about 35° C. Besides, the temperature distribution of the display panel is distributed (such as linear distribution), thus the temperature T in a certain location of the display panel can be expressed by:

$$T = T_0 + ky; \quad (12)$$

wherein T is the temperature at the certain location of the display panel, and k is the thermal conductivity.

Figure 4:
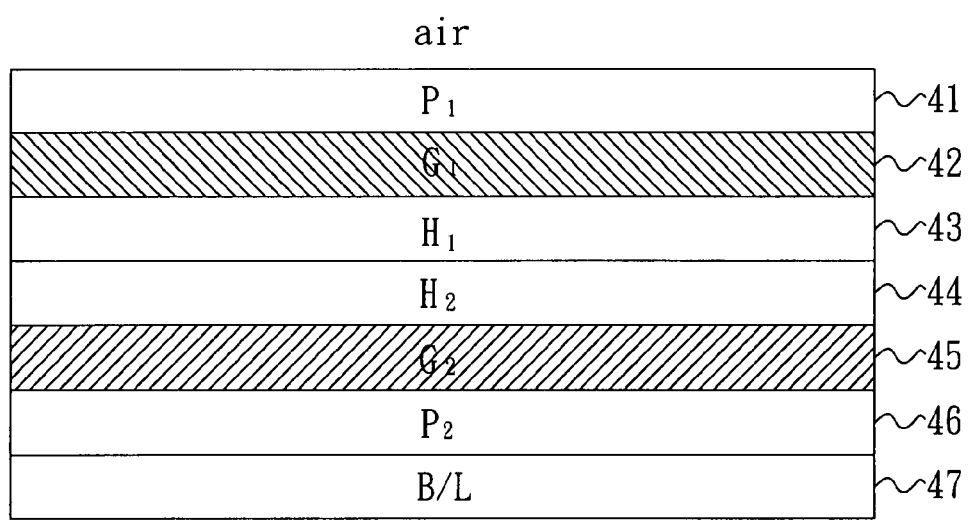
FIG. 4 is a schematic view of a simplified model of a display panel for the derivation of a formula according to the present invention.

As shown in FIG. 4, the display panel of the present invention includes a first polarizer ($P_1$) 41, a first adhesive layer ($G_1$) 42, a first substrate ($H_1$) 43, a second substrate ($H_2$) 44, a second adhesive layer ($G_2$) 45, a second polarizer ($P_2$) 46, and the total thickness of the display panel is about 1.68 mm. Besides, the display panel is disposed on a backlight module (B/L) 47, in order to receive light provided by the backlight module 47 and display corresponding information, image, or picture.

In the display panel of FIG. 4, the thermal conductivity k is about 2.98° C./mm, and the temperature in each interface is shown in Table 1:

TABLE 1

| Interface between "a" layer and "b" layer (a/b) | Thickness (mm) of the layer "a" | Temperature Gradient (° C.) of the layer "a" | Interface Temperature (° C.) |
| --- | --- | --- | --- |
| air/P$_1$ | 0 | 0 | 30 |
| P$_1$/H$_1$ | 0.215 | 0.64 | 30.64 |
| G$_1$/H$_1$ | 0.025 | 0.07 | 30.71 |
| H$_1$/H$_2$ | 0.6 | 1.79 | 32.50 |
| H$_2$/G$_2$ | 0.6 | 1.79 | 34.29 |
| G$_2$/P$_2$ | 0.025 | 0.07 | 34.36 |
| P$_2$/BL | 0.215 | 0.64 | 35.00 |
| Total | 1.68 | 5.00 | |

In Table 1, the temperature of each layer is the average temperature of each layer. In addition, the first substrate 43 and the second substrate 44 are both made of glass whose thermal expansion coefficient is about $3.2 \times 10^{-6}$ °C.$^{-1}$, while the first polarizer 41 and the second polarizer 46 are made of the same material whose thermal expansion coefficient is about $3.0 \times 10^{-5}$ °C.$^{-1}$. Therefore, by filling the aforementioned thermal expansion coefficients of the first polarizer 41, the first substrate 43, the second substrate 44 and the second polarizer 46 into Table 1, Table 2 is obtained as follows.

TABLE 2

| | Average Temp. (° C.) | ΔT | αΔT | 1/αΔT | $\alpha_H \Delta T/\alpha_P \Delta T$ | $1 - (\alpha_H \Delta T/\alpha_P \Delta T)$ |
| --- | --- | --- | --- | --- | --- | --- |
| T$_{P1}$ | 30.32 | 5.32 | 1.60E−04 | 6.27E+03 | 1.32E−01 | 8.68E−01 |
| T$_{H1}$ | 31.605 | 6.605 | 2.11E−05 | 4.73E+04 | | |
| T$_{H2}$ | 33.395 | 8.395 | 2.69E−05 | 3.72E+04 | 9.25E−02 | 9.07E−01 |
| T$_{P2}$ | 34.68 | 9.68 | 2.90E−04 | 3.44E+03 | | |

As shown in Table 2, no matter for the upper portion of the display panel (i is substantially equal to 1) or the lower portion of the display panel (i is substantially equal to 2), the values of ($\alpha_H \Delta T/\alpha_P \Delta T$) for the two portions of the display panel are both about 0.10. As a result, the values of $(1-\alpha_H \Delta T/\alpha_P \Delta T)$ for the two portions of the display panel are both about 1. Accordingly, the left portion of equation (11) can be further simplified as follows.

$$\left[\frac{[\alpha_{P1}(\Delta T_{P1}) - \alpha_H(\Delta T_{H1})](1 - \alpha_{P1}(\Delta T_{P1}))}{[\alpha_{P2}(\Delta T_{P2}) - \alpha_H(\Delta T_{H2})](1 - \alpha_{P2}(\Delta T_{P2}))}\right] =$$

$$\frac{\alpha_{P1}^2 (\Delta T_{P1})^2 [1 - \alpha_H(\Delta T_{H1})/\alpha_{P1}(\Delta T_{p1})][1/\alpha_{P1}(\Delta T_{P1}) - 1]}{\alpha_{P2}^2 (\Delta T_{P2})^2 [1 - \alpha_H(\Delta T_{H2})/\alpha_{P2}(\Delta T_{P2})][1/\alpha_{P2}(\Delta T_{P2}) - 1]} \approx$$

$$\frac{\alpha_{P1}^2 (\Delta T_{P1})^2 \times 1 \times 1/\alpha_{P1}(\Delta T_{P1})}{\alpha_{P2}^2 (\Delta T_{P2})^2 \times 1 \times 1/\alpha_{P2}(\Delta T_{P2})} = \frac{\alpha_{P1}(\Delta T_{P1})}{\alpha_{P2}(\Delta T_{P2})}$$

Subsequently, in the example of the display panel of FIG. 4, the equation (11) can be rewritten into the form as follows.

$$\frac{\alpha_{P1}(\Delta T_{P1})}{\alpha_{P2}(\Delta T_{P2})} = \left(\frac{h_1}{h_2}\right)^{1-n} \quad (13)$$

In the following, two embodiments will be given for describing the relation between the "thermal expansion coefficients" of the upper polarizer and the lower polarizer, and the "thickness" of two adhesive layers respectively adhered to the upper substrate and the lower substrate of the display panel of the present invention.

Figure 5:
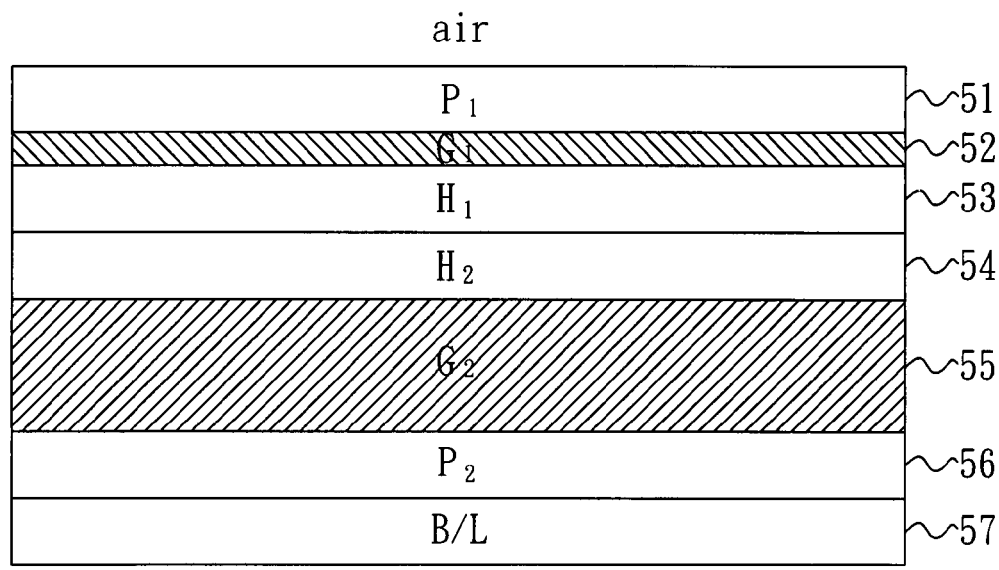
FIG. 5 is a schematic view of a display panel according to the first embodiment of the present invention.

In the first embodiment, the display panel of the present invention, as shown in FIG. 5, includes a first polarizer (P$_1$) 51, a first adhesive layer (G$_1$) 52, a first substrate (H$_1$) 53, a second substrate (H$_2$) 54, a second adhesive layer (G$_2$) 55, and a second polarizer (P$_2$) 56. Besides, the display panel is disposed on the backlight module (B/L) 57 in order to receive light provided by the backlight module 57 for displaying corresponding information, image, or picture.

In this embodiment, the polarizer 51 and the polarizer 56 are made of a same material, i.e., $\alpha_{P1}$ is substantially equal to $\alpha_{P2}$, so equation (13) can be simplified as follows.

$$\frac{h_1}{h_2} = \left(\frac{\Delta T_{P2}}{\Delta T_{P1}}\right)^{1/1-n}. \quad (14)$$

In addition, the adhesive layers 52 and 55 are both made of pressure-sensitive adhesive (PSA,) i.e., the exponent n of the power law is about 0.54, $\Delta T_{P1}$, is substantially equal to 5° C., and $\Delta T_{P2}$ is substantially equal to 10° C., similar to the conditions of FIG. 4. Accordingly, equation (14) is taken in calculation as follows.

$$\frac{h_1}{h_2} = \left(\frac{\Delta T_{P2}}{\Delta T_{P1}}\right)^{1/n-1} = \left(\frac{10}{5}\right)^{1/0.54-1} = 0.22.$$

From the calculation, it is known that when the first adhesive layer 52 has a thickness h$_1$ close to about 0.22 times of the thickness h$_2$ of the second adhesive layer 55, the deformed is near the borders of the display panel of the present invention can still be prevented, even after the long-term exposure to the heat produced by the underlying backlight module. Thus, the light-leakage near the border of the display panel can be prevented. Namely, in the first embodiment, if the thickness of the first adhesive layer 52 is about 25 μm and the thickness of the second adhesive layer 55 is about 113.64 μm, the warpage near the borders of the display panel of the present invention can still be prevented, even after the long-term exposure to heat produced by the underlying backlight module.

Although in the first embodiment, the thickness h$_1$ of the first adhesive layer is close to about 0.22 times of the thickness h$_2$ of the second adhesive layer, the ration between the thickness h$_1$ and the thickness h$_2$ is not limited to the above value, i.e. 0.22. Preferably, the thickness h$_1$ of the first adhesive layer is in a range of about 0.1 to about 0.7 times of the thickness h$_2$ of the second adhesive layer.

Figure 6:
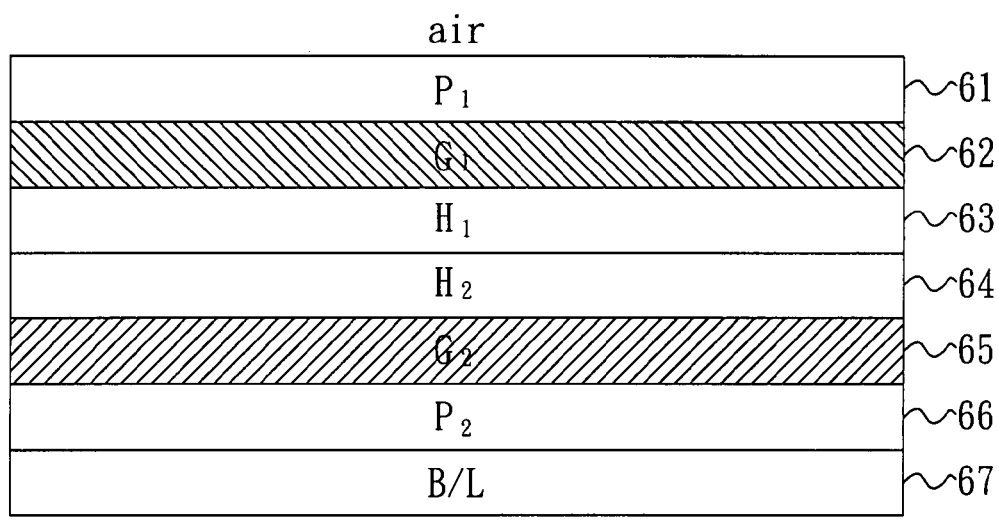
FIG. 6 is a schematic view of a display panel according to the second embodiment of the present invention.

FIG. 6 is a schematic view of a display panel according to the second embodiment of the present invention. In the second embodiment, the display panel of the present invention includes a first polarizer (P$_1$) 61, a first adhesive layer (G$_1$) 62, a first substrate (H$_1$) 63, a second substrate (H$_2$) 64, a second adhesive layer (G$_2$) 65, and a second polarizer (P$_2$) 66. Besides, the display panel is disposed on the backlight module (B/L) 67 in order to receive light provided by the backlight module 57 for displaying corresponding information, image, or pictures.

In this embodiment, the first adhesive layers 62 and the second adhesive layer 65 both have the same thickness, i.e., h1 is substantially equal to h2, so equation (13) can be simplified as follows.

$$\frac{\alpha_{P1}}{\alpha_{P2}} = \frac{\Delta T_{P2}}{\Delta T_{P1}}. \quad (15)$$

In addition, for $\Delta T_{P1}$ is substantially equal to 5° C. and $\Delta TP_2$ is substantially equal to 10° C., similar to the conditions as shown in FIG. 4, equation (15) can be rewritten as:

$$\frac{\alpha_{P1}}{\alpha_{P2}} = \frac{\Delta T_{P2}}{\Delta T_{P1}} = \frac{10}{5} = 2.$$

From the calculation, it is known that when the thermal expansion coefficient $\alpha_{P1}$ of the first polarizer 61 is about two times of the thermal expansion coefficient $\alpha_{P2}$ of the second polarizer 66, the deformed is near the borders of the display panel of the present invention can still be prevented, even after the long-term exposure to the heat produced by the underlying backlight module. Thus, the light-leakage near the border of the display panel can be prevented. Namely, in the second embodiment, if the first polarizer 61 is made of polyvinyl alcohol (PVA) and the protection layer (not shown) for the first polarizer 61 is made of triacetyl cellulose, whose thermal expansion coefficient is about $4.4 \times 10^{-5}$ ° $C.^{-1}$, the protection layer (not shown) for the second polarizer 66 is made of complex of triacetyl cellulose and discotic liquid crystal (DLC), whose thermal expansion coefficient is about $2.4 \times 10^{-5}$ ° $C.^{-1}$, the deformed is near the borders of the display panel having these two polarizers (the first polarizer 61 and the second polarizer 66) of the present invention can still be prevented, even after the long-term exposure to the heat produced by the underlying backlight module.

Although in the second embodiment, the thermal expansion coefficient $\alpha_{P1}$ of the first polarizer is about two times of the thermal expansion coefficient $\alpha_{P2}$ of the second polarizer, the ration between the thermal expansion coefficient $\alpha_{P1}$ and thermal expansion coefficient $\alpha_{P2}$ is not limited to the above value, i.e. 2. Preferably, the thermal expansion coefficient $\alpha_{P1}$ of the first polarizer is in a range of about 1.0 to about 5.5 times of the thermal expansion coefficient $\alpha_{P2}$ of the second polarizer.

In summary, by one of the two means listed below: (1) when the first and second polarizers of the display panel are a same material, making the second adhesive layer closer to the backlight module to have the thickness $h_2$ is substantially greater than the thickness $h_1$ of the first adhesive layer; or (2) when the first thickness $h_1$ and the second thickness $h_2$ are the same, making the first polarizer to have the first thermal expansion coefficient $\alpha_{P1}$ is substantially greater than the second thermal expansion coefficient $\alpha_{P2}$ of the second polarizer; the deformed is near the borders of the display panel of the present invention can still be prevented, even after the long-term exposure to the heat produced by the underlying backlight module. Thus, the light-leakage near the border of the display panel can be prevented. The number of the defects of the optical films of the backlight module caused by the contact of the display panel to the optical films is also reduced.

Figure 7:
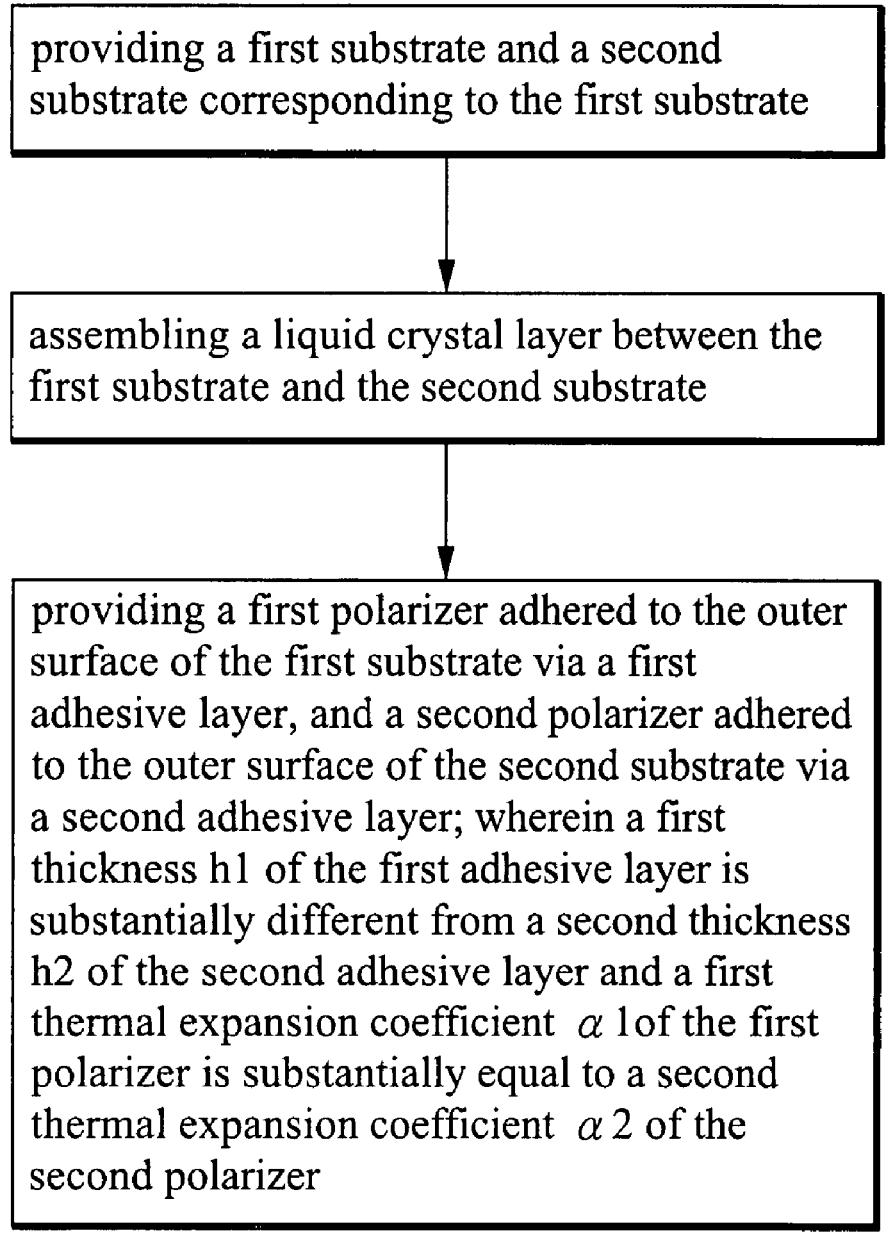
FIG. 7 is a flowchart showing a method for manufacturing a display panel according to the third embodiment of the present invention.

FIG. 7 is a flowchart showing a method for manufacturing a display panel according to the third embodiment of the present invention. As shown in FIG. 7, the method comprise: providing a first substrate and a second substrate corresponding to the first substrate; assembling a liquid crystal layer between the first substrate and the second substrate or namely assembling a liquid crystal layer between the first substrate and the second substrate; and providing a first polarizer adhered to the outer surface of the first substrate via a first adhesive layer, and a second polarizer adhered to the outer surface of the second substrate via a second adhesive layer; wherein a first thickness $h_1$ of the first adhesive layer is substantially different from a second thickness $h_2$ of the second adhesive layer and a first thermal expansion coefficient $\alpha_1$ of the first polarizer is substantially equal to a second thermal expansion coefficient $\alpha_2$ of the second polarizer. Besides, in the present embodiment, the method further comprises a step forming a protection layer on at least one of an outer surface of the first polarizer and an outer surface of the second polarizer. The method further comprises a step providing a backlight module below the first polarizer.

It notes that the providing a first polarizer adhered to the outer surface of the first substrate via a first adhesive layer, and a second polarizer adhered to the outer surface of the second substrate via a second adhesive layer, wherein the first adhesive layer and the second adhesive layer can be formed on the outer surface of the first substrate and the outer surface of the second and so as to let the first polarizer and the second polarizer adhered to the outer surface of the first/second substrates in one embodiment, the first adhesive layer and the second adhesive layer can be formed on the first polarizer and the second polarizer and so as to let the first polarizer and the second polarizer adhered to the outer surface of the first/second substrates in other embodiment, the first adhesive layer can be formed on the outer surface of the first substrate and the second adhesive layer can be formed on the second polarizer and so as to let the first polarizer and the second polarizer adhered to the outer surface of the first/second substrates in another embodiment, or the first adhesive layer can be formed on the first polarizer and the second adhesive layer can be formed on the outer surface of the second substrate and so as to let the first polarizer and the second polarizer adhered to the outer surface of the first/second substrates in further another embodiment.

Moreover, in the method for manufacturing a display panel according to the third embodiment of the present invention, the step of providing a first substrate and a second substrate corresponding to the first substrate of the method, for example, comprises: providing the first base and the second base; forming an active layer on the first base; and forming a color filter layer on at least one of the first base and the second base.

As a result, the deformation near the borders of the display panel being manufactured by the aforesaid manufacturing method can be prevented, even after the long-term exposure to the heat produced by the underlying backlight module. Thus, the light-leakage near the border of the display panel can also be prevented. Moreover, the number of the defects of the optical films of the backlight module caused by the contact of the display panel to the optical films is reduced.

Figure 8:
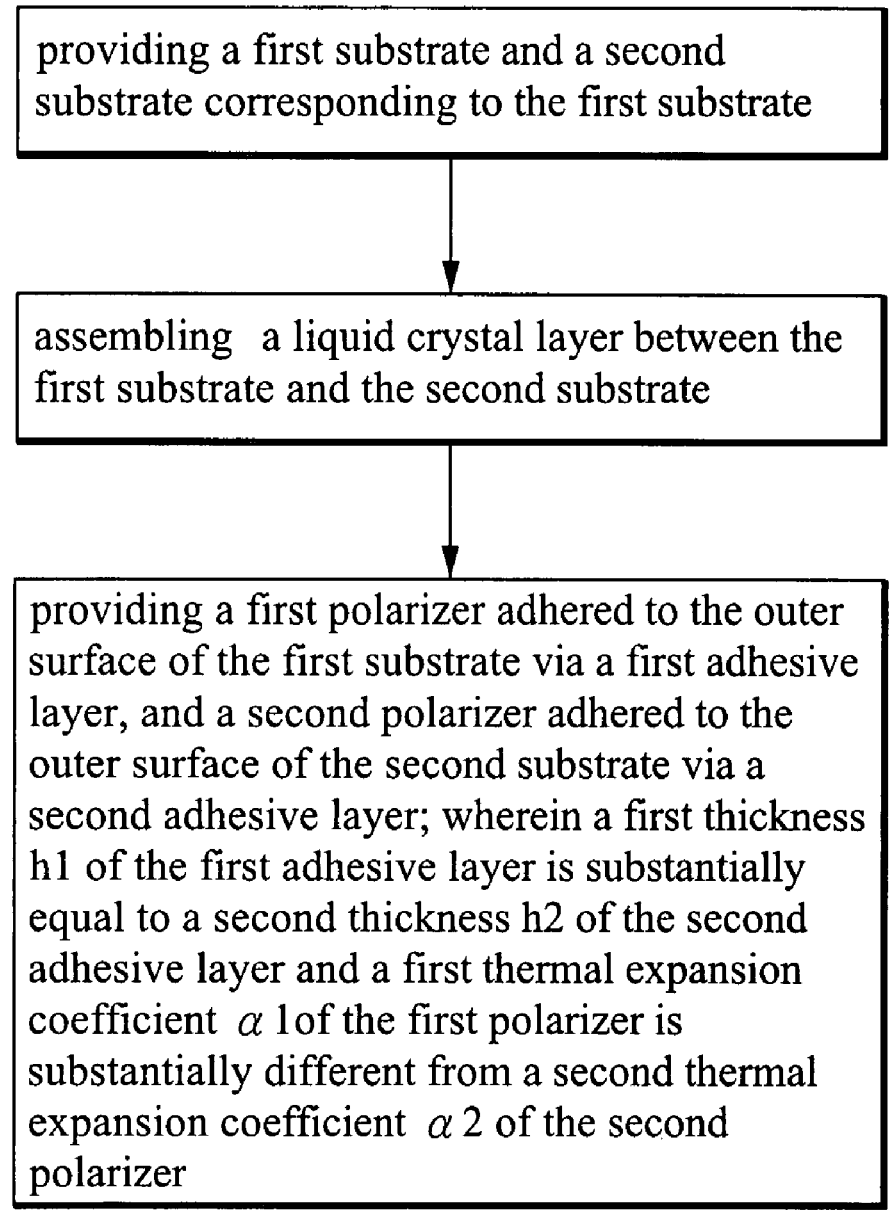
FIG. 8 is a flowchart showing a method for manufacturing a display panel according to the fourth embodiment of the present invention.

FIG. 8 is a flowchart showing a method for manufacturing a display panel according to the fourth embodiment of the present invention. As shown in FIG. 8, the method comprises: providing a first substrate and a second substrate corresponding to the first substrate; assembling a liquid crystal layer between the first substrate and the second substrate or namely assembling a liquid crystal layer between the first substrate and the second substrate; and providing a first polarizer adhered to the outer surface of the first substrate via a first adhesive layer, and a second polarizer adhered to the outer surface of the second substrate via a second adhesive layer; wherein a first thickness $h_1$ of the first adhesive layer is substantially equal to a second thickness $h_2$ of the second adhesive layer and a first thermal expansion coefficient $\alpha_1$ of the first polarizer is substantially different from a second thermal expansion coefficient $\alpha_2$ of the second polarizer. Besides, in the present embodiment, the method further comprising: forming a protection layer on at least one of an outer surface of the first polarizer and an outer surface of the second polarizer. The method further provides a backlight module below the first polarizer.

It notes that the providing a first polarizer adhered to the outer surface of the first substrate via a first adhesive layer, and a second polarizer adhered to the outer surface of the second substrate via a second adhesive layer, wherein the first adhesive layer and the second adhesive layer can be formed on the outer surface of the first substrate and the outer surface of the second and so as to let the first polarizer and the second polarizer adhered to the outer surface of the first/second substrates in one embodiment, the first adhesive layer and the second adhesive layer can be formed on the first polarizer and the second polarizer and so as to let the first polarizer and the second polarizer adhered to the outer surface of the first/second substrates in other embodiment, the first adhesive layer can be formed on the outer surface of the first substrate and the second adhesive layer can be formed on the second polarizer and so as to let the first polarizer and the second polarizer adhered to the outer surface of the first/second substrates in another embodiment, or the first adhesive layer can be formed on the first polarizer and the second adhesive layer can be formed on the outer surface of the second substrate and so as to let the first polarizer and the second polarizer adhered to the outer surface of the first/second substrates in further another embodiment.

Moreover, in the method for manufacturing a display panel according to the fourth embodiment of the present invention, the method comprising: providing a first substrate and a second substrate corresponding to the first substrate, comprises: providing the first base and the second base; forming an active layer on the first base; and forming a color filter layer on at least one of the first base and the second base.

As a result, the deformation near the borders of the display panel being manufactured by the aforesaid manufacturing method can be prevented, even after the long-term exposure to the heat produced by the underlying backlight module. Thus, the light-leakage near the border of the display panel can also be prevented. Moreover, the number of the defects of the optical films of the backlight module caused by the contact of the display panel to the optical films is reduced.

Moreover, in the present invention, at least one of the first substrate and the second substrate preferably is made of glass, but not limited; the first substrate and the second substrate can be made of quartz, thermosetting plastic, resin, silicon chip, or other material. At least one of the first polarizer and the second polarizer is made of polyvinyl alcohol for explanation, but not limited; the first polarizer and the second polarizer can also be made of other material. The protection layer can be optionally disposed on at least one of the surface of the first polarizer and the surface of the second polarizer. The material of the protection layer comprises triacetyl cellulose, complex of triacetyl cellulose and discotic liquid crystal, cyclo olefin copolymer, or others, or combinations thereof. At least one of the first adhesive layer and the second adhesive layer is made of pressure-sensitive adhesive for explanation, but not limited; the first adhesive layer and the second adhesive layer can also be made of thermoset adhesive, others kinds of adhesive, or combinations thereof.

Besides, the display panel of the present invention can be used in an electro-optic device, such as a portable device (i.e. mobile phone, video camera, camera, notebook, game station, watch, music player, e-mail transceiver, map navigator, digital photo or the like), a video product (i.e. video player or the like), a screen, a television, an indoor/outdoor billboard, or a panel of a projector, etc. The display panel of the present invention can be a transmissive panel, a semi-transmissive panel, a reflective panel, a dual display panel, a vertical alignment (VA) panel, an in-plane switching (IPS) panel, a multi-domain vertical alignment (MVA) panel, a twisted nematic (TN) panel, a super twisted nematic (STN) panel, a patterned vertical alignment (PVA) panel, a super patterned vertical alignment (S-PVA) panel, an advanced super view (ASV) panel, a fringe-field switching (FFS) panel, a continuous pin-wheel alignment (CPA) panel, an axial symmetry micelle (ASM) panel, an optical compensation bend (OCB) panel, a super in-plane switching (S-IPS) panel, an advanced super in-plane switching (AS-IPS) panel, a ultra fringe-field switching (UFFS) panel, a polymer stabilization alignment (PSA) panel, a dual-view panel, a triple-view panel, a color filter on array (COA) panel, an array on color filter (AOC) panel, other panels, or any combination thereof.

Although the present invention has been explained in relation to its embodiment, it is to be understood that many other possible modifications and variations can be made without departing from the spirit and scope of the present invention as hereinafter claimed.

What is claimed is:

1. A display panel, comprising:
a first substrate;
a second substrate;
a liquid crystal layer interposed between the first substrate and the second substrate;
a first polarizer, disposed on a surface of the first substrate, and having a first thermal expansion coefficient $\alpha_1$;
a second polarizer, disposed on a surface of the second substrate, and having a second thermal expansion coefficient $\alpha_2$;
a first adhesive layer, formed between the first polarizer and the first substrate, and having a first thickness $h_1$; and
a second adhesive layer, formed between the second polarizer and the second substrate, and having a second thickness $h_2$;
wherein the first thickness $h_1$ is substantially different from the second thickness $h_2$ and $h_1/h_2$ is substantially about equal to 0.22, and the first thermal expansion coefficient $\alpha_1$ is substantially equal to the second thermal expansion coefficient $\alpha_2$.

2. The display panel of claim 1, wherein at least one of the materials of the first polarizer and the second polarizer comprises polyvinyl alcohol.

3. The display panel of claim 1, further comprising a protection layer disposed on at least one of a surface of the first polarizer and a surface of the second polarizer.

4. The display panel of claim 3, wherein the material of the protection layer comprises triacetyl cellulose, complex of triacetyl cellulose and discotic liquid crystal, cyclo olefin copolymer, or combinations thereof.

5. The display panel of claim 1, wherein at least one of the material of the first adhesive layer and the material of the second adhesive layer comprises a pressure-sensitive adhesive, a thermoset adhesive, or combinations thereof.

6. The display panel of claim 1, wherein the first thickness $h_1$ is substantially smaller than the second thickness $h_2$.

7. An electro-optic apparatus incorporating the display panel of the claim 1.

8. The display panel of claim 1, wherein the thickness of the first adhesive layer $h_1$ is about 25 μm and the thickness of the second adhesive layer $h_2$ is about 113.64 μm.

9. A display panel, comprising:

a first substrate;

a second substrate;

a liquid crystal layer interposed between the first substrate and the second substrate;

a first polarizer, disposed on a surface of the first substrate, and having a first thermal expansion coefficient $\alpha_1$;

a second polarizer, disposed on a surface of the second substrate, and having a second thermal expansion coefficient $\alpha_2$;

a first adhesive layer, formed between the first polarizer and the first substrate, and having a first thickness $h_1$; and a second adhesive layer, formed between the second polarizer and the second substrate, and having a second thickness $h_2$;

wherein the first thickness $h_1$ is substantially equal to the second thickness $h_2$, and the first thermal expansion coefficient $\alpha_1$ is substantially different from the second thermal expansion coefficient $\alpha_2$.

10. The display panel of claim 9, wherein at least one of the materials of the first polarizer and the second polarizer comprises polyvinyl alcohol.

11. The display panel of claim 9, further comprising a protection layer disposed on at least one of a surface of the first polarizer and a surface of the second polarizer.

12. The display panel of claim 11, wherein the material of the protection layer comprises triacetyl cellulose, complex of triacetyl cellulose and discotic liquid crystal, cyclo olefin copolymer, or combinations thereof.

13. The display panel of claim 9, wherein at least one of the material of the first adhesive layer and the material of the second adhesive layer comprises a pressure-sensitive adhesive, thermoset adhesive, or combinations thereof.

14. The display panel of claim 9, wherein the first thermal expansion coefficient $\alpha_1$ is substantially greater than the second thermal expansion coefficient $\alpha_2$.

15. An electro-optic apparatus incorporating the display panel of the claim 9.

16. The display panel of claim 9, wherein $\alpha_1/\alpha_2$ is substantially equal to 2.

17. A method for manufacturing a display panel, comprising:

providing a first substrate and a second substrate corresponding to the first substrate;

assembling a liquid crystal layer between the first substrate and the second substrate; and providing a first polarizer adhered to the outer surface of the first substrate via a first adhesive layer, and a second polarizer adhered to the outer surface of the second substrate via a second adhesive layer; wherein a first thickness $h_1$ of the first adhesive layer is substantially different from a second thickness $h_2$ of the second adhesive layer and $h_1/h_2$ is substantially about equal to 0.22, and a first thermal expansion coefficient $\alpha_1$ of the first polarizer is substantially equal to a second thermal expansion coefficient $\alpha_2$ of the second polarizer.

18. The method of claim 17, further comprising forming a protection layer on at least one of an outer surface of the first polarizer and an outer surface of the second polarizer.

19. The method of claim 17, wherein providing a first substrate and a second substrate corresponding to the first substrate comprises:

providing the first base and the second base;

forming an active layer on the first base; and forming a color filter layer on at least one of the first base and the second base.

20. The method of claim 17, further comprising providing a backlight module below the first polarizer.

21. A method for manufacturing a display panel, the method comprising:

providing a first substrate and a second substrate corresponding to the first substrate;

assembling a liquid crystal layer between the first substrate and the second substrate; and providing a first polarizer adhered to the outer surface of the first substrate via a first adhesive layer, and a second polarizer adhered to the outer surface of the second substrate via a second adhesive layer; wherein a first thickness $h_1$ of the first adhesive layer is substantially equal to a second thickness $h_2$ of the second adhesive layer and a first thermal expansion coefficient $\alpha_1$ of the first polarizer is substantially different from a second thermal expansion coefficient $\alpha_2$ of the second polarizer.

22. The method of claim 21, further comprising forming a protection layer on at least one of an outer surface of the first polarizer and an outer surface of the second polarizer.

23. The method of claim 21, wherein providing a first substrate and a second substrate corresponding to the first substrate comprises:

providing the first base and the second base;

forming an active layer on the first base; and forming a color filter layer on at least one of the first base and the second base.

24. The method of claim 21, further comprising providing a backlight module below the first polarizer.

* * * * *